United States Patent
You et al.

(10) Patent No.: US 9,699,753 B1
(45) Date of Patent: Jul. 4, 2017

(54) TEST APPARATUS AND TEST METHOD

(71) Applicant: Rohde & Schwarz GmbH & Co. KG, München (DE)

(72) Inventors: Jia You, Nanjing (CN); Henry Gropp, München (DE); Feng Xie, Markt Schwaben (DE); Karsten Friedrich, Haar (DE); Claudiu Krakowski, Poing (DE)

(73) Assignee: ROHDE & SCHWARZ GMBH & CO. KG, München (DE)

( * ) Notice: Subject to any disclaimer, the term of this patent is extended or adjusted under 35 U.S.C. 154(b) by 0 days.

(21) Appl. No.: 15/047,320

(22) Filed: Feb. 18, 2016

(51) Int. Cl.
*H04W 24/00* (2009.01)
*H04B 17/00* (2015.01)
*H04W 56/00* (2009.01)
*H04W 24/02* (2009.01)
*H04W 24/08* (2009.01)
*H04W 24/06* (2009.01)

(52) U.S. Cl.
CPC ......... *H04W 56/003* (2013.01); *H04W 24/02* (2013.01); *H04W 24/06* (2013.01); *H04W 24/08* (2013.01)

(58) Field of Classification Search
CPC .............. H04B 17/0085; H04B 17/309; H04B 17/2681; H04W 24/00; H04W 24/06; H04W 24/08; H04W 56/00
USPC ............ 455/67.11, 67.14, 423, 424
See application file for complete search history.

(56) References Cited

U.S. PATENT DOCUMENTS

| | | | | |
|---|---|---|---|---|
| 5,831,974 A * | 11/1998 | Suonvieri | ............. | H04J 3/0682 455/67.11 |
| 6,490,266 B1 * | 12/2002 | Kim | ..................... | H04B 17/309 455/67.14 |
| 8,060,077 B2 * | 11/2011 | De Pomian | ........... | H04W 24/08 455/424 |
| 2016/0050573 A1* | 2/2016 | Merkel | ................. | H04W 24/06 455/67.11 |

* cited by examiner

*Primary Examiner* — Quochien B Vuong
(74) *Attorney, Agent, or Firm* — Jenkins, Wilson, Taylor & Hunt, P.A.

(57) ABSTRACT

A test apparatus for testing a base station of a wireless communication system, comprises a downlink port, which receives a downlink signal from the base station, an uplink port, which emits an uplink signal to the base station, a signal processing unit, which is coupled to the downlink port and analyzes the downlink signal for timing information and generates a timing synchronization signal based on the downlink signal, and a signal generator, which is coupled to the signal processing unit and the uplink port and generates a predetermined signal frame and emits the generated predetermined signal frame based on the synchronization signal via the uplink port to the base station.

18 Claims, 3 Drawing Sheets

TEST APPARATUS AND TEST METHOD

TECHNICAL FIELD

The invention relates to a test apparatus for testing a base station of a wireless communication system and a respective method.

BACKGROUND

Although applicable to any system that uses wireless base stations, the present invention will be described in combination with cell phone base stations, like GSM, LTE or UMTS base stations.

Testing of base stations for mobile phone or cell phone networks is a very complex and time consuming task.

Accordingly, there is a need for testing base stations with reduced effort.

SUMMARY OF THE INVENTION

The present invention provides a test apparatus with the features of claim 1 and a test method with the features of claim 11.

A test apparatus for testing a base station of a wireless communication system comprises a downlink port, which receives a downlink signal from the base station, an uplink port, which emits an uplink signal to the base station, a signal processing unit, which is coupled to the downlink port and analyses the downlink signal for timing information and generates a timing synchronization signal based on the downlink signal, and a signal generator, which is coupled to the signal processing unit and the uplink port and generates a predetermined signal frame and emits the generated predetermined signal frame based on the timing synchronization signal via the uplink port to the base station.

A test method for testing a base station of a wireless communication system comprises receiving a downlink signal from the base station, analyzing the downlink signal for timing information, generating a timing synchronization signal based on the downlink signal, generating a predetermined signal frame based on the timing synchronization signal, and emitting the generated predetermined signal frame based on the synchronization signal to the base station. Further, the signal quality of the emitted signal frame can be measured in the base station.

Base stations, like e.g. GSM, LTE or UMTS base stations, provide in the downlink signal all the information that is needed in order to synchronize a mobile device to the respective base station. If a test system decodes the complete downlink signal and uses knowledge of the protocol, which the base station uses, the test system can synchronize with the base station like a mobile device and transmit signals or data frames to the base station. Test systems, which decode the protocol and analyze the content of the downlink signal are said to work in a so called "signaling mode". This signal mode requires extensive computations and synchronization may be slow.

In production the testing of base stations needs to be performed fast an in an economical manner. Therefore, the process of synchronizing is omitted and a dedicated cable based synchronization output is provided from the base station to the test system, which allows the test system to synchronize with the base station without decoding a complex protocol.

With the present invention, the necessity to provide the cable-based synchronization output at the base station is removed. Instead the signal processing unit will analyze the downlink signal, especially without decoding the contents of the downlink signal or the respective protocol, and looking for timing information only. The signal processing unit then generates the timing synchronization signal, which can be used by the signal generator as a basis to determine when to emit the predetermined signal frame to the base station.

Therefore, the signal generator does not need to generate in real time data frames, which correspond to a specific protocol. Instead the signal generator will simply emit a predetermined data frame at the specific point in time, at which the base station expects said predetermined data frame. To the base station, when it receives the predetermined data frame, the predetermined data frame will appear like a regular data frame, which is e.g. emitted by a synchronized mobile device. In consequence, the base station will treat said predetermined data frame as a regular data frame and not discard the predetermined data frame as erroneous. Because the predetermined data frame is treated like a normal correct data frame from a mobile device in the base station the reception quality of the base station can be tested with the predetermined data frame. For example signal parameters of the transmitted signal frame can be measured in the base station.

Summing up, with the help of the signal processing unit the signal generator can emit the predetermined data frame exactly at that point at time, at which the predetermined data frame is expected by the base station. Neither is it necessary to analyze a complex data protocol nor is it necessary to provide a separate discrete cable based synchronization signal.

Therefore, the test apparatus can be produced without a dedicated synchronization input port and without the ability to decode complex wireless protocols, i.e. with reduced complexity. Furthermore, the test apparatus can e.g. be used with base stations, which don't provide a cable based synchronization output, like e.g. so called femto cell base stations.

Further embodiments of the present invention are subject of the further subclaims and of the following description, referring to the drawings.

In a possible embodiment, the signal generator can comprise a data memory, which stores a number, i.e. one or more, of data frames, wherein when generating the predetermined signal frame the signal generator reads one of the stored data frames from the memory and uses this data frame as the signal frame. In the memory, different data frames for different communication protocols and/or sequences of data frames of one protocol can be stored. The test apparatus can therefore e.g. be used with different wireless communication protocols by simply indicating to the signal generator, which data frame to read from the memory.

In a possible embodiment, the signal generator can timely synchronize with the base station based on the synchronization signal and periodically emit the generated predetermined signal frame via the uplink port. Providing more than one single data frame to the base station allows more profound testing of the base station during a given time period.

In a possible embodiment, the signal generator can emit a predetermined sequence of different data frames, which are stored in the memory. Instead of only providing a single predetermined data frame, different but still predetermined data frames can be sent to the base station, e.g. to test functions of the base station, which required different data frames to be transmitted but don't require real time interaction by the test apparatus.

In a possible embodiment, the downlink and/or uplink port can comprise a radio frequency section, which is configured to receive the downlink signal or generate based on the generated predetermined signal frame radio frequency signals and emit said radio frequency signals to the base station, respectively. The uplink port can then e.g. be connected to the base station via a cable to only test the RF components of the base station and not the wireless transmission through air at the test site.

In a possible embodiment, the signal processing unit can comprise a capture unit, which is coupled to the downlink port and captures the downlink signal. The capture unit can e.g. comprise radio frequency, RF, components and respective analog-to-digital (A/D) converters, which sample the received analog signal. Further any amount of memory can be provided to store the digital data representing the downlink signal.

In a possible embodiment the signal processing unit can comprise an analyzer, which is coupled to the capture unit and identifies in the captured downlink signal a base station clock, especially a base station frame clock, like e.g. used in the GSM Synchronization Channel, and provides the timing synchronization signal based on said base station clock.

In a possible embodiment the signal processing unit can comprise a clock-pulse generator, which is coupled to the analyzer, wherein the clock-pulse generator can synchronize to the base station based on the timing synchronization signal and generate respective synchronized clock pulses. The clock-pulse generator will therefore generate clock pulses, which are synchronous to the signals emitted by the base station. The clock-pulse generator can e.g. generate the clock pulses with a frequency or based on the frequency of the base station clock, in LTE-Systems e.g. 10 ms. Such synchronous clock pulses can then be easily used to emit data frames at specific points in time as required by the base station.

In a possible embodiment the clock-pulse generator can after startup generate independent, i.e. un-synchronized or not-synchronized, clock pulses. Furthermore, the analyzer can determine the displacement between the independent clock pulses and the base station clock and provide the synchronization signal to the clock-pulse generator, which after receiving the synchronization signal can synchronize to the base station clock. The analyzer can be a free running analyzer, which starts analyzing at no specific point in time after startup as soon as it is ready. Alternatively the analyzer can start analyzing the displacement between the independent clock pulses and the base station clock based on the unsynchronized clock pulses of the clock-pulse generator. While the clock-pulse generator is not synchronized to the base station clock, the signal generator will not emit any data frames to the base station. Only after synchronization of the clock-pulse generator will the signal generator use the synchronized clock pulses. That means that the signal generator will start emitting the predetermined data frame after the synchronization of the clock-pulse generator. The predetermined data frames received by the base station will therefore be in synch with the base station frame clock and can be decoded by the base station. In the base station statistical or measured values can then be evaluated to gain knowledge about the signal quality in or the reception performance of the base station.

In a possible embodiment the signal processing unit and the signal generator during testing of a base station can repeatedly synchronize to the base station. A drifting of the clock-pulse generator can therefore effectively be prevented.

The above embodiments and developments can, where practical, be combined with one another in any way. Further possible embodiments, developments and implementations of the invention also include combinations that have not been mentioned explicitly of features of the invention described above or below in relation to the embodiments. In particular, a person skilled in the art will also add individual aspects as improvements or additions to the particular basic form of the present invention.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
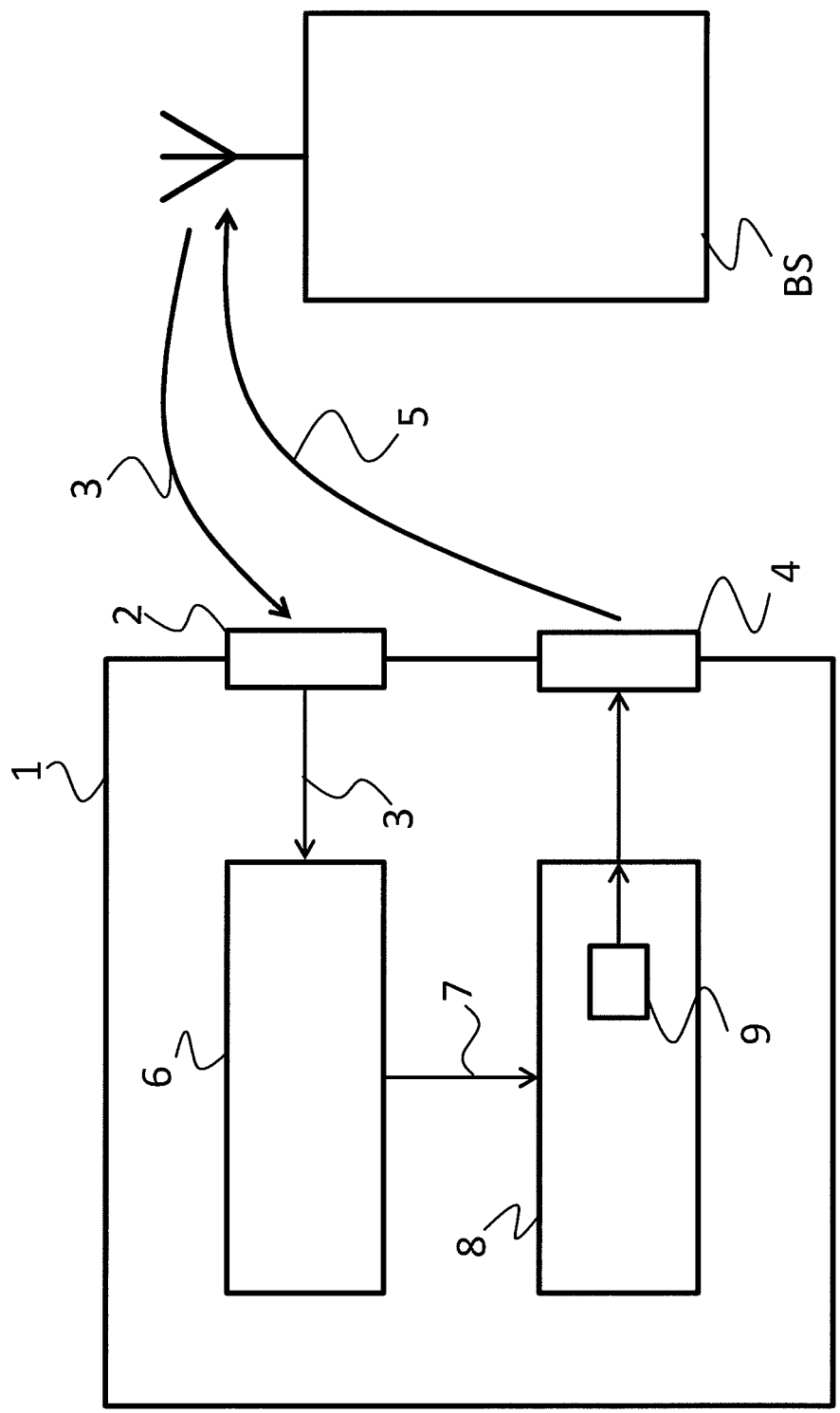
FIG. 1 shows a block diagram of an embodiment of an apparatus according to an embodiment of the present invention.

The enclosed drawings are intended to provide further understanding of the embodiments of the invention. They illustrate embodiments and, in conjunction with the description, serve to explain principles and concepts of the invention. Other embodiments and many of the stated advantages can be found from the drawings. The elements of the drawings are not necessarily shown in scale with one another.

In the figures like reference signs denote like elements unless stated otherwise. In particular, in the figures of the drawing, any elements and components that are identical, have the same function and work in the same way, are each given the same reference signs, unless stated otherwise.

DETAILED DESCRIPTION OF THE DRAWINGS

FIG. 1 shows a block diagram of an embodiment of an apparatus 1 according to the present invention.

A LTE base station BS is provided as the device under test. The base station BS emits a downlink signal 3, which can e.g. be a Synchronization Channel downlink signal 3 as used in GSM cellular telephone systems. The GSM Synchronization Channel is a control channel, which is used in downlink only and allows mobile devices to quickly identify nearby cells and synchronize to that cell's base station, i.e. the respective TDMA structures.

The base station BS in testing can be coupled via a cable, e.g. a shielded cable, to the downlink port 2. This prevents any external influences from falsifying the measurement results.

The downlink port 2 provides the downlink signal 3 to the signal processing unit 6. In the signal processing unit 6 the downlink signal 3 is analyzed for timing information. Such timing information can e.g. be the current clock or frame clock of the base station BS, which is transmitted in the Synchronization Channel signal.

Based on said timing information the signal processing unit 6 will generate a timing synchronization signal 7 and provide said timing synchronization signal 7 to the signal generator 8.

The signal generator 8 is configured to generate one single predetermined signal frame 9, which can be transmitted in the uplink signal 5 to the base station BS via the uplink port 4 at points in time, which can be deduced from the timing synchronization signal 7. If here only one single predetermined signal frame 9 is mentioned, the person skilled in the art understands that the predetermined signal frame 9 is not hard coded into the signal generator 8. In fact, the predetermined signal frame 9 can e.g. be configured prior to starting a test sequence with the test apparatus 1 and can be adapted to different base stations, protocols or transmission schemes.

It is to be understood, that the signal generator 8 can periodically transmit the predetermined signal frame 9 in a synchronized manner to the base station BS.

The configuration of FIG. 1 allows transmitting signal frames 9 to the base station BS, which will be accepted by the base station BS as correct, i.e. synchronized, frames. In order to generate the signal frames 9 it is not necessary to decode a complex wireless signaling protocol. Instead only that information has to be extracted from the downlink signal 3 that comprises timing information and is needed to generate the timing synchronization signal 7. Only as an example the timing information can e.g. comprise the start of a data transmission after a break of a certain length. Such a start of a data transmission can e.g. mark the start of a frame cycle of the base station BS. Another example of the timing information can be a specific bit pattern in the downlink signal 3 or the like.

In the test apparatus 1 of FIG. 1 no further elements are shown, which can be used to analyze and measure the downlink signal 3 quality. It is to be understood that any further elements can be added to the test apparatus 1, which might be needed to measure the quality of the downlink signal 3, when needed, without departing from the scope of the present patent application.

Figure 2:
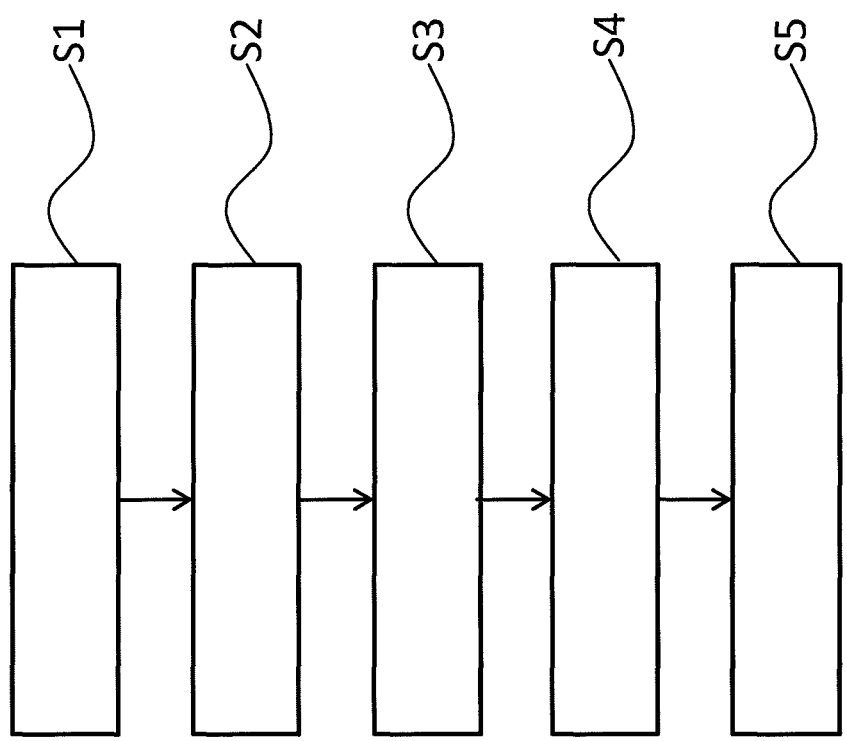
FIG. 2 shows a flow diagram of an embodiment of a method according to an embodiment of the present invention.

FIG. 2 shows a flow diagram of an embodiment of a method according to an embodiment of the present invention.

The test method starts with receiving, S1, a downlink signal 3, 103 from the base station BS. The received downlink signal 3, 103 is analyzed, S2, for timing information, as already indicated above. Based on the downlink signal 3, 103, i.e. the timing information, a timing synchronization signal 7, 107 is generated, S3. Finally, a predetermined signal frame 9, 109 is generated, S4, and emitted, S5, to the base station BS based on the synchronization signal 7, 107. This especially means that the timing synchronization signal 7 forms the basis for the timing of the transmission of the predetermined signal frame 9, 109 to the base station BS. For transmission of the generated predetermined signal frame 9, 109 radio frequency signals can be generated and emitted to the base station BS.

When analyzing the downlink signal 3, 103, the downlink signal 3, 103 can be captured and a base station clock 130, especially a base station frame clock, can be identified in the captured downlink signal 3, 103. The timing synchronization signal 7, 107 can then be generated based on said base station clock 130. Generating the timing synchronization signal 7, 107 can e.g. be performed by synchronizing a clock-pulse generator 128 to the base station BS based on the timing synchronization signal 7, 107 and generating respective synchronized clock pulses 129 with the clock-pulse generator 128. Generating, S4, and emitting, S5, are then performed indirectly based on the timing synchronization signal 7, 107 and directly based on the clock pulses 129.

After startup of the test apparatus 1, 101 or the base station BS or after initiation of the test, the clock-pulse generator 128 may be out of synch with the base station BS.

To take this fact into account the providing of the clock pulses 129 to the signal generator 8, 108 may be delayed until the clock pulses 129 can be generated in synch with the base station BS. To bring the clock pulses 129 in synchrony with the base station BS independent clock pulses 129 can be generated after startup of the clock-pulse generator 8, 108, the base station BS or the test. Further, a displacement between the independent clock pulses 129 and the base station clock 130 is determined, and the clock-pulse generator 8, 108 is synchronized to the base station clock 130 based on the determined displacement.

The person skilled in the art will understand, that the synchronization of the clock pulses 129 with the base station BS can be performed repeatedly during the test to prevent a drifting of the clock-pulse generator 128 or the signal generator 8, 108.

Furthermore, not only one single signal frame 5, 105 can be generated and transmitted to the base station BS. For example, a number of data frames 122, 123, 124 can be stored in a memory 121. When generating, s4, the predetermined signal frame 5, 105 one of the stored data frames can be read from the memory 121. This allows to e.g. not only emit one single signal frame 5, 105 periodically but to provide a sequence of different data frames 122, 123, 124, without requiring real time capability in the test apparatus 1, 101.

Figure 3:
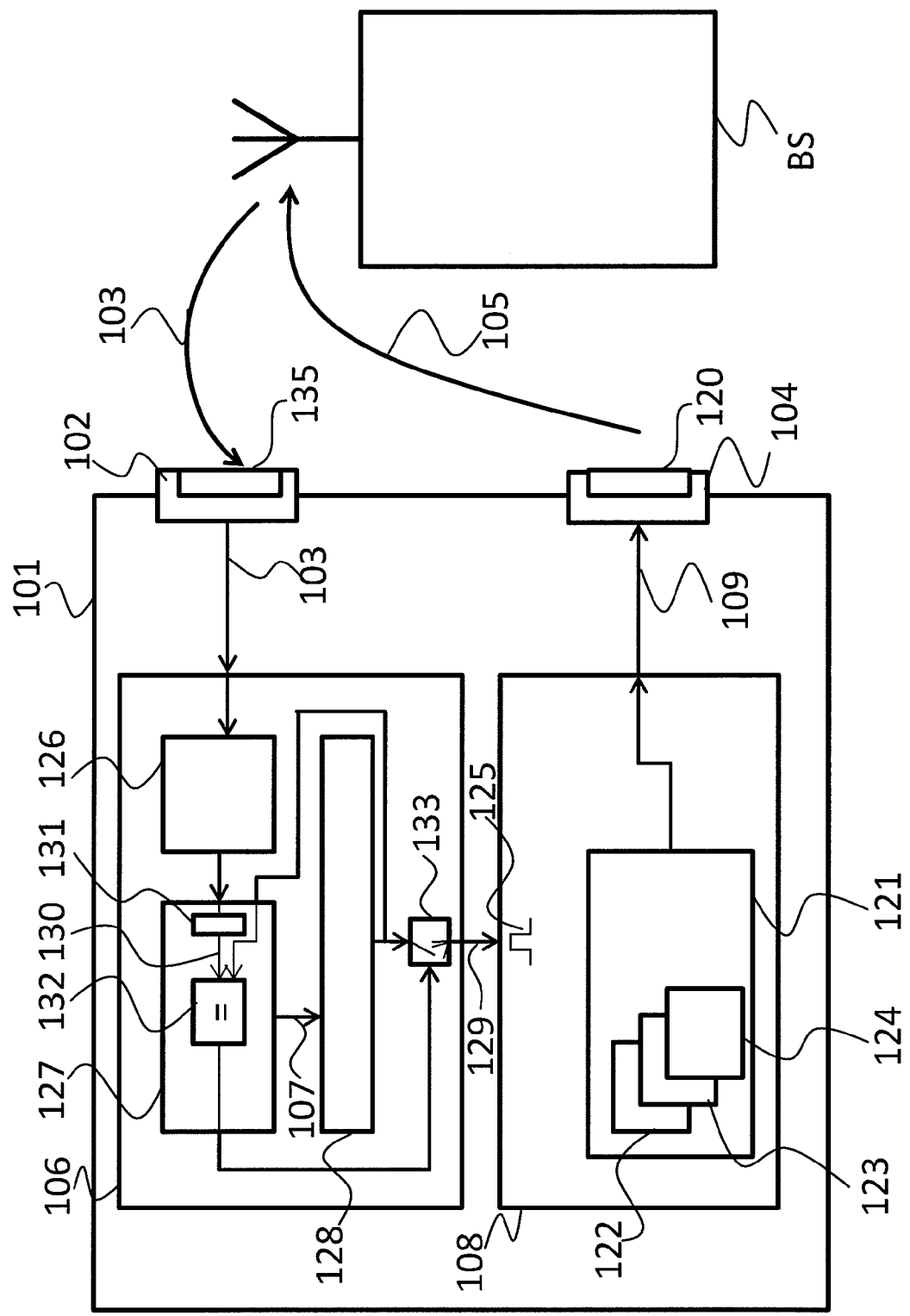
FIG. 3 shows a block diagram of another embodiment of an apparatus according to an embodiment of the present invention.

FIG. 3 shows a block diagram of another embodiment of an apparatus 101. The apparatus 101 is based on the apparatus 1 of FIG. 1 and the common elements of apparatus 1 and apparatus 101 are referenced by the same reference signs but in the hundreds.

The signal processing unit 106 comprises a capture unit 126, which receives and captures the downlink signal 103 for further processing by analyzer 127. The analyzer 127 identifies in the captured downlink signal 103 a base station clock 130 with the identification unit 131. An example for a base station clock 130 can e.g. be a base station frame clock as used in the GSM Synchronization Channel. Another example for a base station clock 130 can be a simple signal transition from one level to another level, e.g. from a level, where no signal is sent by the base station BS to a level where a signal is sent from the base station BS. The base station clock 130 can then e.g. be derived from the time difference between two such transitions. The timing synchronization signal 107 can then be generated based on said base station clock 130. The timing synchronization signal 107 can e.g. comprise information about the phase and frequency of the base station clock 130 and serve to adjust the phase and frequency of the clock-pulse generator 128.

The clock-pulse generator 128 directly activates the signal generator 108 via a trigger input 125 of the signal generator 108. The signal generator 128 can e.g. generate and transmit to the base station BS one signal frame 105 for every clock pulse 129, which it receives via the trigger input 125. As an alternative, the frequency of the clock-pulses can be higher or lower than the frequency at which signal frames 105 are provided by the signal generator 108. For this purpose, a counter, divider, or multiplier can be provided in the signal generator 108.

Therefore, by using the clock pulses 129 the signal generator 108 synchronizes to the base station BS and generates respective synchronized signal frames 105.

As already indicated above, after startup of the clock-pulse generator 128, the test apparatus 101 or the base station BS the clock-pulse generator 128 can generate independent, i.e. not-synchronized, clock pulses 129. These clock pulses will not be provided to the signal generator 108. Instead, the analyzer 127 will determine the displacement in phase and frequency between the independent clock pulses 129 and the base station frame clock 130 with a comparator 132. Based on this determination the analyzer 127 can configure the clock-pulse generator 128, e.g. by providing the synchronization signal 107 to the clock-pulse generator 128, which after receiving the synchronization signal 107 synchronizes to the base station frame clock.

For preventing the not-synchronized clock pulses from being forwarded to the signal generator 108 a switch or gate 133 can be provided, which can be operated by the analyzer 127. The analyzer 127 can e.g. receive the clock pulses 129 and compare the clock pulses 129 to the base station frame clock. If the clock pulses 129 match the base station frame clock, i.e. are synchronous to the base station frame clock, the analyzer 127 can activate the gate or switch 133 and forward the clock pulses 129 to the signal generator 108.

In the signal generator 108 a memory 121 is provided, which stores a number of data frames 121, 122, 123. When emitting the signal frame 109 via the radio frequency section 120 of the uplink port 104, the signal generator 108 selects one of the data frames 121, 122, 123 and emits the selected data frame 121, 122, 123 as the signal frame 109. It is to be understood, that the signal generator 108 can also emit a predetermined sequence of signal frames 109, which can comprise the same or different data frames 121, 122, 123.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

The elements of the drawings are not necessarily drawn to scale relative to each other. Like reference numerals designate corresponding similar parts.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF USED REFERENCE SIGNS 1 test apparatus
2 downlink port
3 downlink signal
4 uplink port
5 uplink signal
6 signal processing unit
7 timing synchronization signal
8 signal generator
9 predetermined signal frame
101 test apparatus
102 downlink port
103 downlink signal
104 uplink port
105 uplink signal
106 signal processing unit
107 timing synchronization signal
108 signal generator
109 predetermined signal frame
120 radio frequency section
121 data memory
122 data frame
123 data frame
124 data frame
125 trigger input
126 capture unit
127 analyzer
128 clock-pulse generator
129 clock pulses
130 base station clock
131 identification unit
132 comparator
133 gate
135 radio frequency section
BS base station

What we claim is:

1. A test apparatus for testing a base station of a wireless communication system, the apparatus comprising:
 a downlink port, which receives a downlink signal from the base station;
 an uplink port, which emits an uplink signal to the base station;
 a signal processing unit, which is coupled to the downlink port and analyses the downlink signal for timing information and generates a timing synchronization signal based on the downlink signal; and
 a signal generator, which is coupled to the signal processing unit and the uplink port and generates a predetermined signal frame and emits the generated predetermined signal frame based on the timing synchronization signal via the uplink port to the base station, wherein the signal generator comprises a data memory, which stores a number of data frames, wherein, when generating the predetermined signal frame, the signal generator reads one of the stored data frames from the memory.

2. The test apparatus according to claim 1, wherein the signal generator timely synchronizes with the base station based on the synchronization signal and periodically emits the generated predetermined signal frame via the uplink port.

3. The test apparatus according to claim 1, wherein the signal generator emits a predetermined sequence of different data frames, which are stored in the memory.

4. The test apparatus according to claim 1, the uplink port comprising a radio frequency section, which is configured to generate based on the generated predetermined signal frame radio frequency signals and emit said radio frequency signals to the base station.

5. The test apparatus according to claim 1, wherein the signal processing unit comprises a capture unit, which is coupled to the downlink port and captures the downlink signal.

6. The test apparatus according to claim 5, wherein the signal processing unit comprises an analyzer, which is coupled to the capture unit and identifies in the captured downlink signal a base station clock, especially a base station frame clock, and provides the timing synchronization signal based on said base station clock.

7. The test apparatus according to claim 1, wherein the signal processing unit comprises a clock-pulse generator, which is coupled to the analyzer, wherein the clock-pulse generator synchronizes to the base station based on the timing synchronization signal and generates respective synchronized clock pulses.

8. The test apparatus according to claim 7, wherein the clock-pulse generator after startup generates independent clock pulses, and wherein the analyzer determines the displacement between the independent clock pulses and the base station clock and provides the synchronization signal to the clock-pulse generator, which after receiving the synchronization signal synchronizes to the base station clock.

9. The test apparatus according to claim 1, wherein the signal processing unit and the signal generator during testing of a base station repeatedly synchronize to the base station.

10. A test method for testing a base station of a wireless communication system, the method comprising:
receiving a downlink signal from the base station;
analyzing the downlink signal for timing information;
generating a timing synchronization signal based on the downlink signal;
generating a predetermined signal frame based on the timing synchronization signal; and
emitting the generated predetermined signal frame based on the synchronization signal to the base station, wherein a number of data frames is stored in a memory, wherein generating the predetermined signal frame comprises reading one of the stored data frames from the memory.

11. The test method according to claim 10, comprising timely synchronizing the emitting with the base station based on the synchronization signal and periodically emitting the generated predetermined signal.

12. The test method according to claim 10, comprising emitting a predetermined sequence of different data frames, which are stored in the memory.

13. The test method according to claim 10, comprising generating based on the generated predetermined signal frame radio frequency signals and emitting said radio frequency signals to the base station.

14. The test method according to claim 10, wherein analyzing the downlink signal comprises capturing the downlink signal.

15. The test method according to claim 14, wherein analyzing the downlink signal comprises identifying in the captured downlink signal a base station clock, especially a base station frame clock, and providing the timing synchronization signal based on said base station clock.

16. The test method according to claim 10, wherein generating a timing synchronization signal comprises synchronizing a clock-pulse generator to the base station based on the timing synchronization signal and generating respective synchronized clock pulses with the clock-pulse generator.

17. The test method according to claim 16, comprising generating independent clock pulses after startup of the clock-pulse generator, and determining the displacement between the independent clock pulses and the base station clock, and synchronizing the clock-pulse generator to the base station clock based on the determined displacement.

18. The test method according to claim 10, wherein generating a timing synchronization signal and generating a predetermined signal frame based on the synchronization signal are performed periodically during testing of the base station.

* * * * *